(12) United States Patent
Lee et al.

(10) Patent No.: US 6,969,817 B2
(45) Date of Patent: Nov. 29, 2005

(54) APPARATUS AND METHOD FOR MACHINING IN CONFINED SPACES

(75) Inventors: Martin Kin-Fei Lee, Niskayuna, NY (US); John Matthew Sassatelli, Valley Falls, NY (US); Todd Joseph Fischer, Ballston Spa, NY (US); Dennis William Roberts, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 97 days.

(21) Appl. No.: 10/605,632

(22) Filed: Oct. 15, 2003

(65) Prior Publication Data
US 2005/0082261 A1 Apr. 21, 2005

(51) Int. Cl.⁷ .............................. B23H 7/26
(52) U.S. Cl. .............. 219/69.2; 204/224 M; 204/297.02; 205/686
(58) Field of Search ............ 219/69.15, 69.17, 219/69.2, 69.11; 205/654, 665, 686; 204/224 M

(56) References Cited

U.S. PATENT DOCUMENTS

| | | | |
|---|---|---|---|
| 3,417,006 A * | 12/1968 | Inoue | 205/641 |
| 3,806,691 A * | 4/1974 | Roach | 219/69.16 |
| 3,846,262 A | 11/1974 | Andrews | 205/670 |
| RE28,564 E | 9/1975 | Inoue | 205/644 |
| 4,259,562 A * | 3/1981 | Cammann et al. | 219/68 |
| 4,549,061 A * | 10/1985 | Nicholas et al. | 219/69.16 |
| 5,618,449 A * | 4/1997 | Houman et al. | 219/69.11 |
| 5,803,978 A | 9/1998 | Amos et al. | 134/1 |
| 5,861,608 A * | 1/1999 | Thompson | 219/69.2 |
| 6,509,539 B2* | 1/2003 | Fischer et al. | 219/69.17 |
| 6,566,623 B2 | 5/2003 | McPhillips | 219/69.17 |

FOREIGN PATENT DOCUMENTS

JP 2-30421 A * 1/1990

* cited by examiner

Primary Examiner—Geoffrey S. Evans
(74) Attorney, Agent, or Firm—Fletcher Yoder

(57) ABSTRACT

A machining apparatus is provided. The machining apparatus includes a discharge machining head assembly and a slide assembly supporting the head assembly. The machining apparatus also includes an electromagnet configured to support the slide assembly in a position on a work piece to machine an area. The slide assembly permits linear displacement of the head assembly generally parallel to the supporting work piece surface.

31 Claims, 4 Drawing Sheets

APPARATUS AND METHOD FOR MACHINING IN CONFINED SPACES

TECHNICAL FIELD

The disclosed apparatus relates to a machining apparatus and method for use in a confined space. More specifically, the disclosed apparatus relates to a machining apparatus that uses either an electrochemical discharge machining technique or an electro-discharge machining technique.

BACKGROUND OF THE INVENTION

Electrochemical machining (ECM) and Electro-discharge machining (EDM) are two techniques used in industry for the machining of metals. In EDM, a DC voltage is applied to a drill electrode and the work piece is eroded by a spark formation in a gap between the drill electrode and the work piece. A dielectric liquid is usually forced into the gap between the electrode and the work piece.

In ECM, a drill electrode is placed in proximity to the work piece and an electric potential is placed across the drill electrode and the work piece. Electrolyte is forced into the gap between the electrode and the work piece, and work material is removed by electro-chemical action.

Commercially available EDM drilling machines, as opposed to EDM machining machines, may use water as the working fluid. In some cases, a non-conductive de-ionized water may be used, however, in some cases tap water may be used wherein the conductivity depends on the mineral content of the tap water. The EDM drilling process is not exactly the same as the EDM machining process. The EDM machining process uses a non-conductive dielectric, whereas in EDM drilling, a semi-conductive fluid may be used EDM machining has some similarity with ECM (Electro-Chemical Machining), which uses highly conductive electrolyte. The metal removal process is partly spark erosion and partly electro-chemical. Therefore, commercial EDM drilling machine uses a process in between that can be called an Electro-chemical Discharge Machining (ECDM).

Typically, for both ECDM and EDM, the drill electrode is hollow and the machining liquid (either the dielectric liquid or the electrolyte, depending upon the application) flows internally along the electrode, issuing through a hole, slot, or some other like aperture at the working face of the electrode. In ECDM, bubbles resulting from electrolytic dissolution cause a non-conducting region between the electrode and material, subsequently leading to an electrical discharge owing to a high electrical voltage applied to this non-conducting region.

Unfortunately, currently available ECDM and EDM tools are large, cumbersome, and have an inability to be used in confined spaces. Currently available ECDM tools and EDM tools are configured for use on work pieces that must be installed in a drilling machine such that the EDM or ECDM drill electrode is moved down towards the work piece, much in the same way as a drill is moved down in a drill press. Additionally, ECDM and EDM currently only drill holes around 6 mm in diameter, when a larger diameter drill hole may be needed to efficiently drill out certain hardware such as pins and screws.

As stated above, currently available EDM and ECDM tools are impossible or very difficult to use in confined spaces. An example of a confined space is the space around the rotor blades attached to a rotor of a turbomachine. Turbomachines include, but are not limited to: steam turbines, compressors, and gas turbines. Rotor blades often need to be removed from the rotor of a turbomachine. Such blade removal may be required, for example, to allow inspection, refurbishment or cleaning of the blades during scheduled maintenance or after a required shutdown of the turbomachine. A rotor for a turbomachine, such as a steam or gas turbine, typically has several rows of blades arranged along its periphery. Each row of blades comprises a circumferential array of blades spaced equally about the circumference of the rotor. Typically, each blade has a root portion by which it is retained in the rotor. Various blade root shapes have been utilized, such as firtree, dove-tail, etc. At assembly, the blade roots are axially slid into correspondingly shaped grooves formed in the rotor circumference. A locking device, such as a pin, is typically used to prevent the blade root from sliding out of the groove. During operation of the turbomachine, the pins may seize in their respective holes. Once these pins have seized, they are very difficult and time consuming to remove by using such known means as hammering or mechanical drilling. Part of the difficulty in removing these pins and tabs is that space is very limited between the hubs of a turbomachine rotor, thus making it very awkward if not impossible to drill out the pins and tabs. Additionally, the blades extend around a 360 degree interior of the turbo machine casing, making it difficult to position cumbersome tools to drill out all the pins.

BRIEF DESCRIPTION OF THE INVENTION

An embodiment of the disclosed machining apparatus relates to a discharge machining head assembly; and an electromagnet configured to support the head assembly in a position to machine an area.

Another embodiment of the disclosed apparatus for machining relates to a discharge machining head assembly; and a head assembly adaptor plate coupled to the discharge machining head assembly.

In addition, an embodiment of the disclosed apparatus for machining relates to a discharge machining head assembly; a sliding assembly coupled to the discharge machining head assembly; and a sliding assembly adaptor plate coupled to the sliding assembly.

Also, an embodiment of the disclosed apparatus for guiding a drill electrode relates to a bushing; an insulated annulus located in the bushing; and a bushing holder coupled to the bushing.

An embodiment of the disclosed method relates to attaching a machining tool to a surface; positioning a drill electrode to a work piece; and drilling the work piece with the machining tool.

BRIEF DESCRIPTION OF THE DRAWINGS

Referring now to the figures, which are exemplary embodiments, and wherein like elements are numbered alike.

DETAILED DESCRIPTION OF THE INVENTION

A detailed description of several embodiments of the disclosed apparatus and method are presented herein by way of exemplification and not limitation with reference to FIGS. 1 through 4.

DISCHARGE MACHINING

Figure 1:
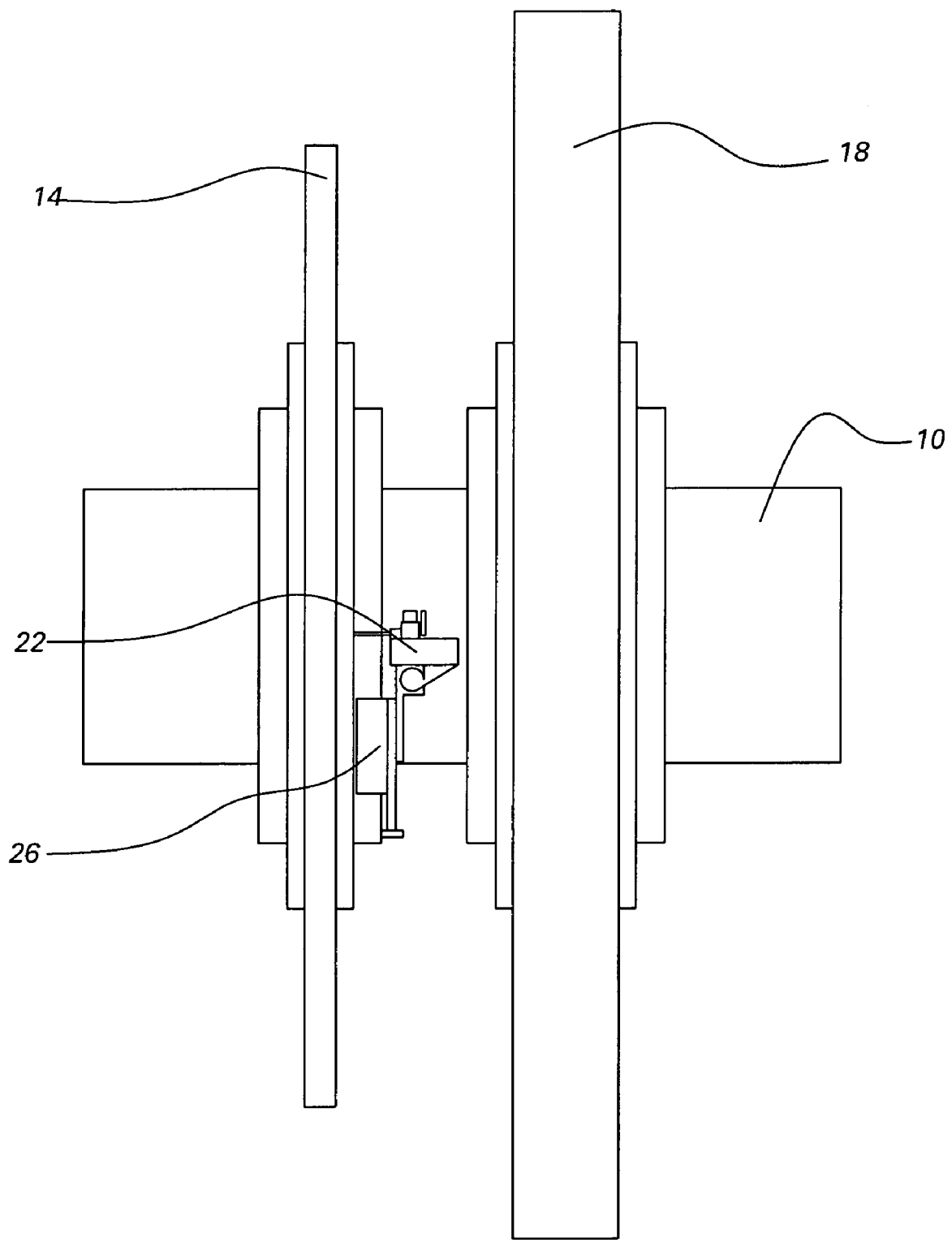
FIG. 1 depicts a view of the disclosed apparatus and part of a steam turbine rotor.

FIG. 1 shows a non-limiting example of a confined space where a portable and small ECDM or EDM apparatus would be useful. A side view of part of a rotor 10 from a turbomachine is shown. In this example the rotor 10 is a steam turbine rotor with a L-1 stage hub 14 and a L-0 stage hub 18. Although FIG. 1 shows the space between two hubs of a rotor, this is only one of many possible uses of such an apparatus in confined spaces. Attached to the L-1 stage hub 14 is a disclosed apparatus 22. The disclosed apparatus 22 is attached to the hub 14 via an electromagnet 26. The electromagnet 26 allows the apparatus 22 to be positioned in a variety of orientations with respect to a work piece, in contrast to commercially available ECDM and EDM tools, which are oriented to vertically drill in a downward direction into a work piece. The disclosed apparatus 22 may be positioned using the electromagnet such that the apparatus may machine downward vertically, upward vertically, at a horizontal, or any angle in between. FIG. 1 shows how the non-traditional discharge machining apparatus 22 may be positioned in the constricted space between two hubs 14, 18 in order to drill out a rotor blade pin (not shown) located on the L-1 stage hub 14.

Figure 2:
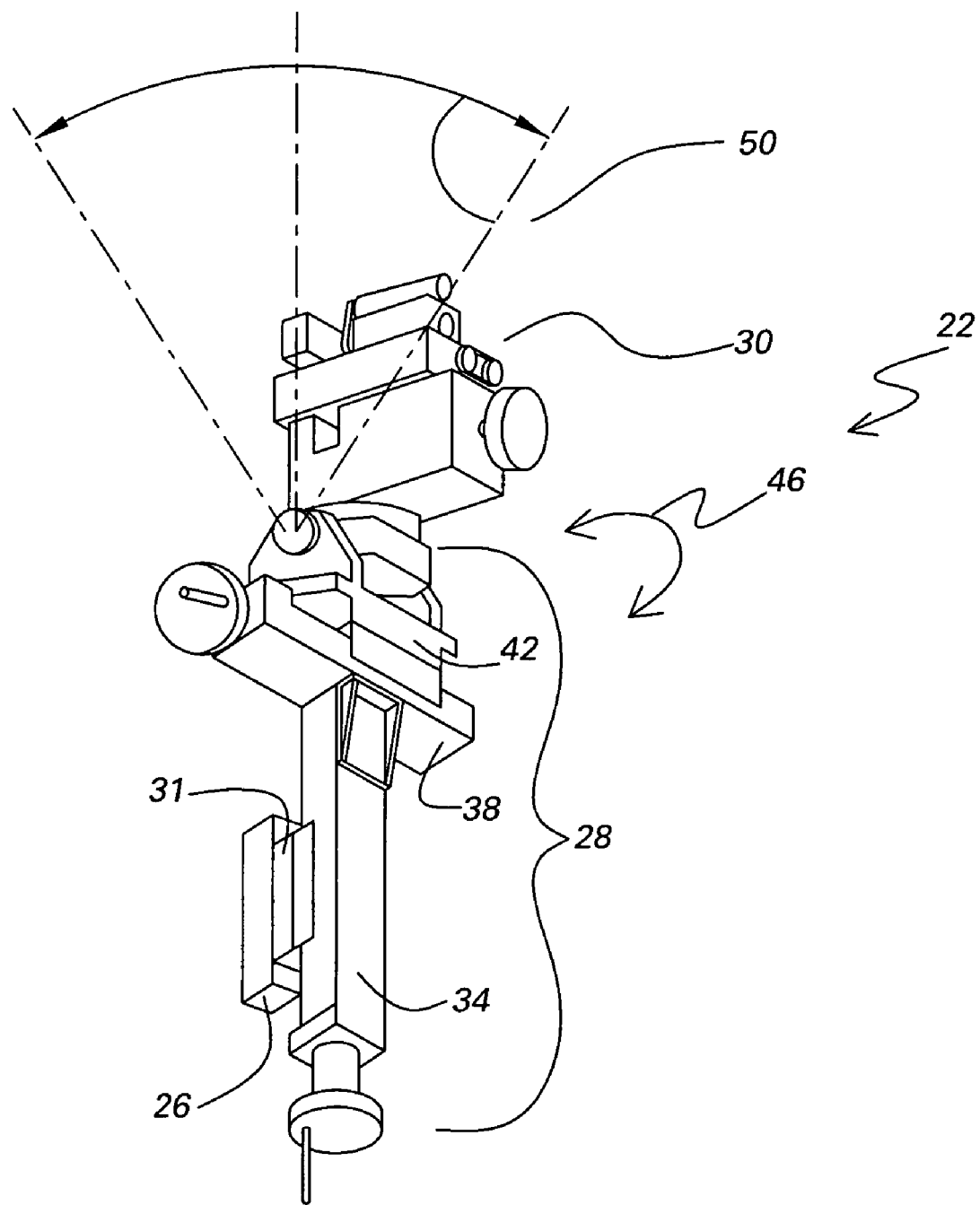
FIG. 2 depicts a perspective view of the disclosed apparatus.

FIG. 2 shows a perspective view of the disclosed apparatus 22 and which can be quickly and accurately positioned to operate in a constricted space with 5 axes of adjustment. 5 axes of adjustment means that an apparatus may be adjusted about 3 linear axes and 2 rotational axes. The head assembly 30 is shown at the top of the apparatus 22, and will be discussed in more detail with respect to FIG. 3. The electromagnet 26 is coupled to a slide assembly 28 via a slide assembly adaptor plate 31. A first manual slide 34 is coupled to the slide assembly adaptor plate 31. The first manual slide 34 allows an operator to position the head assembly 30 after the disclosed apparatus 22 has been attached to a surface, such as the hub 14, via the electromagnet 26. A second manual slide 38 is operatively coupled to the first manual slide 34 and may be configured to provide perpendicular translation of the head assembly 30 with respect to the first manual slide 34. The second slide 38 is operatively coupled to a mini tilt and swivel vice 42. The slide assembly 28 comprises: the first manual slide 34; the second manual slide 38; and the mini tilt and swivel vice 42. The mini tilt and swivel vice 42 allows for rotation of the head assembly 30 in both directions illustrated by the curved arrow 46. The mini tilt and swivel vice 42 allows for rotation of the head assembly 30 in the direction of the curved arrow 46. The mini tilt and swivel vice 42 also allows for a angular tilting of the head assembly 30, this angular tilting is represented by the arrow 50. Although manual slides and mini tilt and swivel vices are discussed in this embodiment, it should be understood that any mechanism that allows for the positioning of the head assembly 30 relative to a surface or area to be drilled would be equivalents that may be used in various embodiments of the disclosed apparatus.

Figure 3:
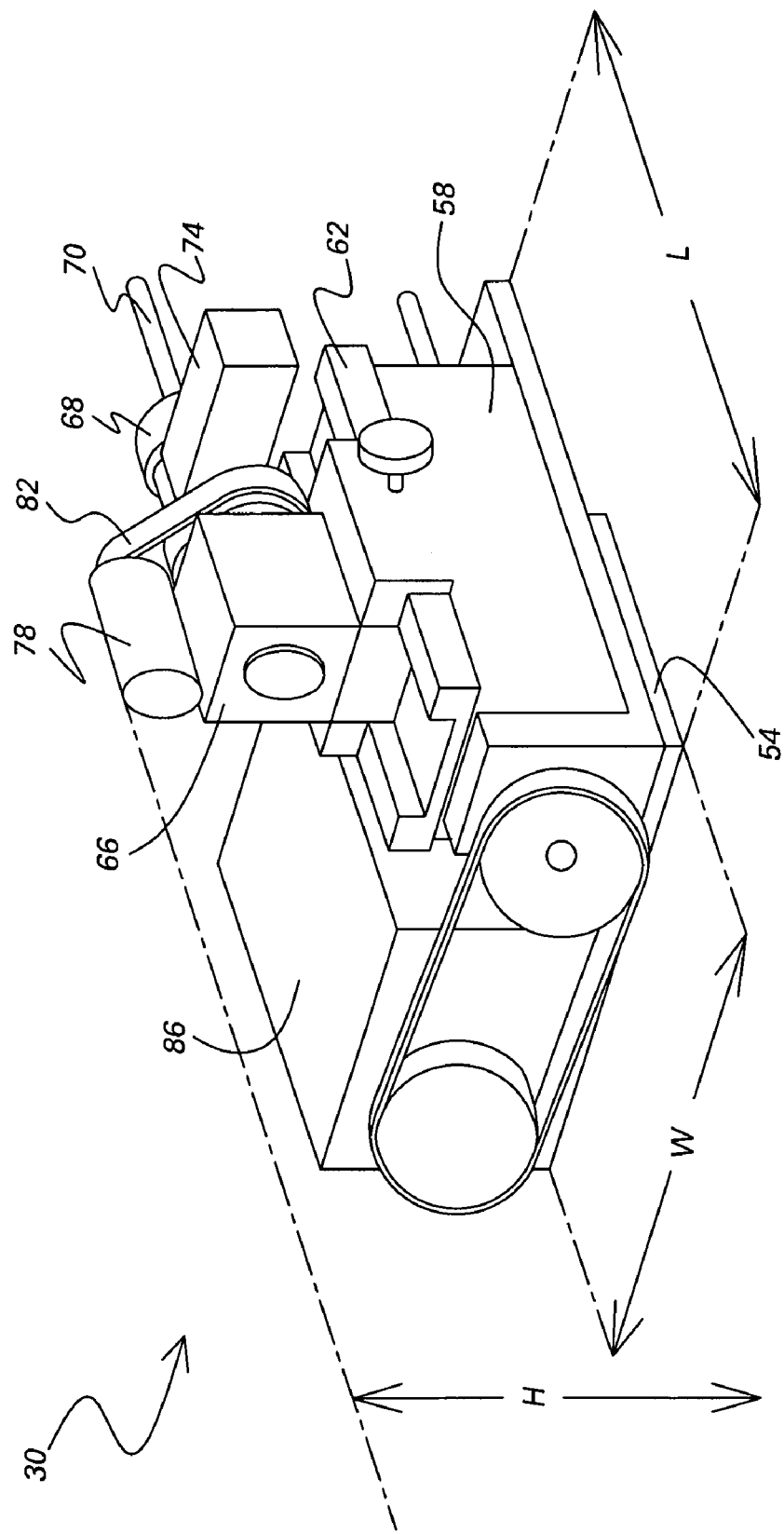
FIG. 3 depicts a perspective view of a head assembly from the disclosed apparatus.

FIG. 3 shows a close up perspective view of an embodiment of the head assembly 30. In this document the term "discharge machining" shall refer to both EDM and ECDM when used with respect to the head assembly 30. A head assembly adaptor plate 54 is used for coupling the head assembly to the mini tilt and swivel vice 42 shown in FIG. 2. Fixedly coupled to the head assembly adaptor plate 54 is a servo-controlled drill slide 58. Fixedly coupled to the servo-controlled drill slide 58 is a manual positioning slide with lock in drill direction 62. The manual position slide 62, the first manual slide 34, the second manual slide 38, and the mini tilt and swivel vise 42 provide the 5 axes of adjustment for the disclosed apparatus. Fixedly coupled to the manual position slide 62 is a spindle bearing block and manifold 66. Rotateably coupled to the spindle bearing block and manifold 66 is a drill spindle 68. The drill spindle 68 may be adapted from a commercially available straight shank collet chuck. Fixedly coupled to the drill spindle 68 is a drill electrode 70. Currently available EDM and ECDM tools drill holes that are about 6 mm, which may not be large enough to drill out various hardware such as pins and screws. In one embodiment of the disclosed apparatus, the drill electrode 70 is sized to drill holes of around 12 mm. In one ECDM embodiment, the spindle bearing block and manifold 66 contains electrolyte, (common tap water can be used in this case), and the manifold is in fluid communication with the drill spindle 68. The drill spindle 68 is in fluid communication with the drill electrode 70 which is hollow. The manifold 66 supplies the drill electrode with the necessary electrolyte for the ECDM process. In another embodiment, the head assembly may be configured for an EDM process, and the manifold in that case would contain a dielectric, which would be supplied to the hollow drill electrode 70. Coupled to the drill spindle 68 is an electric brush holder 74. The brush holder 74 provides a voltage to the drill spindle 68 and drill electrode 70. An electrical power supply, not shown, will be in communication with the brush holder 74 when the apparatus 22 is in operation. When the drill electrode 70 is sized for drilling holes of about 12 mm, the use of the brush holder 74 allows for a greater amount of current to reach the electrode. Attached to the spindle bearing block and manifold for electrolyte 66 is a spindle motor 78. The spindle motor 78 transmits power to rotate the drill spindle 68 and the attached drill electrode 70 via a transmission means 82. The transmission means 82 may be, but is not limited to, a pulley and belt system, a gear system or a direct coupling. Fixedly coupled to the head assembly adaptor plate 54 is a servomotor 86 that transmits translational movement to the servo-controlled drill slide 58 via a transmission means 90. The transmission means 90 may be, but is not limited to, a pulley and belt system, a gear system or a direct coupling. The servomotor 86 receives a signal proportional to the current supplied to the drill electrode 70. Based on the current signal, the servomotor will move the servo-controlled drill slide 58. The servo-controlled drill slide 58 will back-out the drill electrode 70 from the work piece if a short circuit condition between the drill electrode 70 and work piece is indicated by the current signal. This backing-out protects the drill electrode 70 from being welded to the work piece.

The head assembly 30 described with respect to FIG. 3 has been arranged to minimize its size to allow for its use in small confined spaces, such as between two hubs 14,18 of a turbomachine. In one embodiment, the length of the head assembly shown in FIG. 3 is 9.6 inches, the width is 6.5 inches and the height is 5.5 inches. Thus, this embodiment of the disclosed apparatus 22 can be used in the confined space between two hubs of a turbomachine shown in FIG. 1, where the hubs are only 10 inches apart. This is especially useful for drilling out stator blade pins. However, the disclosed apparatus 22 may be used anywhere where ECDM or EDM would be useful, especially in small confined spaces. This head assembly 30 may also be used for on-site drilling of holes for Non Destructive Evaluation Procedure as well as Notch Cross Key removal. In another embodiment, the head assembly may be configured with smaller components to be about one half the size of the embodiment described above.

Figure 4:
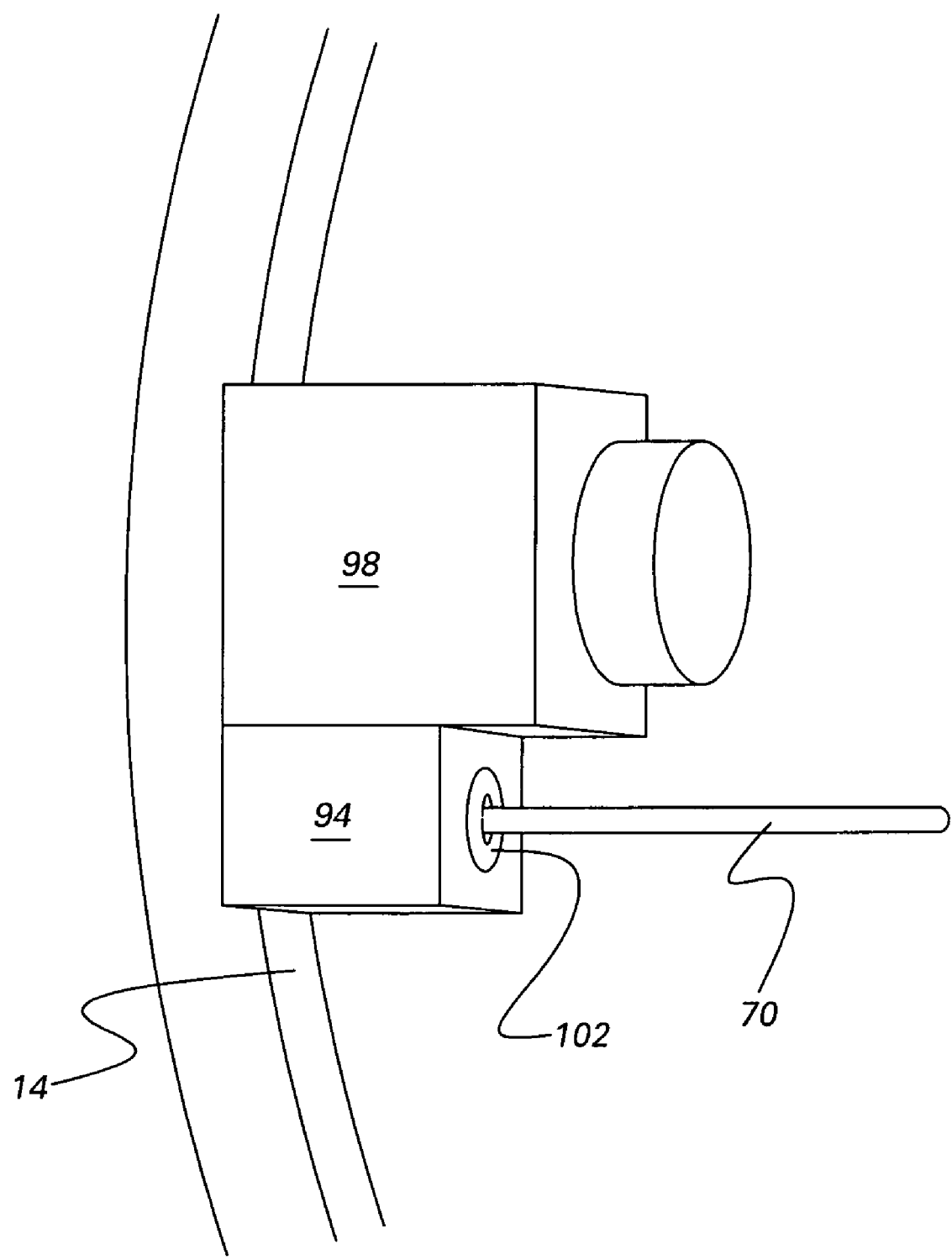
FIG. 4 depicts a guide bushing.

FIG. 4 shows another aspect of an embodiment of the disclosed apparatus. A guide bushing 94 is shown attached to a work piece, in this example hub 14, via a bushing holder 98. In one embodiment, the bushing holder may be any of number of commercially available magnetic bases. The guide bushing 94 guides the drill electrode 70 to a specified area on a work piece, in this example an area on a hub 14. The guide bushing 94 has an insulated annulus 102 that can come into contact with the drill electrode 70 without short circuiting current from the drill electrode 70. A guide bushing may be necessary when the drill electrode 70 is of such a length that the end of the drill electrode wobbles, causing an imprecise machining.

The disclosed apparatus 22 may be configured to couple to a multi-axis robot arm to perform ECDM or EDM in many versatile orientations, including vertical, horizontal, and angles in between. The non-traditional discharge machining apparatus 22 may couple to such a robot arm via the slide assembly adaptor plate 31 or head assembly adaptor plate 54.

In one embodiment of the disclosed apparatus, the servomotor 86 may be a Panasonic servomotor, model number MSMA042A1A. The servo-controlled drill slide 58 may be a Deltron Slides model number LS2-4. The spindle motor 78 may be a Micro-Drives motor, model number MD2230. The manual position slide with lock in drill direction 62 may be a may be a Velmex Unislide model number ZA2506A-S2_BK-TSL. The power supplied to the disclosed apparatus may be up to a maximum input power of about 120 kVA, with a maximum working current of about 120 A and an output voltage of about 80–250V. The fluid delivery system be at a maximum pressure of about 5 MPa (725 psi). The output power may be pulsed. The disclosed apparatus has the advantage of allowing the operation of a EDM or ECDM apparatus in a confined space. Additionally, the disclosed apparatus is portable, that is, the apparatus can be moved to the work piece. The disclosed apparatus may have 5 axes of adjustment so that the axis of the drill electrode may be accurately aligned with the work piece. Misalignment may cause damage to the work piece, for example, a work piece may be a steam turbine rotor, which is a very expensive piece of equipment. The disclosed apparatus has very little to no mechanical drilling force. Relatively high drilling forces, such as those in a mechanical drill, may cause a drill to deviate from a straight path due to non-uniformity of the work-piece material or the uneven geometry of the drill, causing damage to work piece. The EDM and ECDM processes are independent of the hardness of the work-piece, therefore the drilling speed is predictable. Also, the disclosed apparatus may be attached to a surface via an electromagnet. The work piece surface can be at any angle because the disclosed apparatus can be attached to the surface via the electromagnet. In addition, the disclosed apparatus can drill holes up to about 12 mm in diameter.

While the embodiments of the disclosed method and apparatus have been described with reference to exemplary embodiments, it will be understood by those skilled in the art that various changes may be made and equivalents may be substituted for elements thereof without departing from the scope of the embodiments of the disclosed method and apparatus. In addition, many modifications may be made to adapt a particular situation or material to the teachings of the embodiments of the disclosed method and apparatus without departing from the essential scope thereof. Therefore, it is intended that the embodiments of the disclosed method and apparatus not be limited to the particular embodiments disclosed as the best mode contemplated for carrying out the embodiments of the disclosed method and apparatus, but that the embodiments of the disclosed method and apparatus will include all embodiments falling within the scope of the appended claims.

What is claimed is:

1. A machining apparatus comprising:
 a discharge machining head assembly;
 a silde assembly supporting the head assembly and
 an electromagnet configured to support the slide assembly in a position on a work piece to machine an area;
 wherein the slide assembly permits linear displacement of the head assembly generally parallel to the supporting work piece surface.

2. The apparatus of claim 1, wherein the head assembly has dimensions no larger than about 6.5 inches by about 9.6 inches by about 5.5 inches.

3. The apparatus of claim 1, wherein the head assembly has dimensions no larger than about 3.3 inches by about 4.8 inches by about 2.8 inches.

4. The apparatus of claim 1, configured to have five axes of adjustment.

5. The apparatus of claim 1, further comprising three manual slides configured to provide three axes of adjustment for the discharge machining head assembly.

6. The apparatus of claim 1, further comprising a tilt and swivel vice configured to provide 2 axes of adjustment for the discharge machining head assembly.

7. The apparatus of claim 1, wherein the discharge machining head assembly is an electro-discharge machining head assembly.

8. The apparatus of claim 1, wherein the discharge machining head assembly is an electrochemical discharge machining head assembly.

9. The apparatus of claim 1 wherein the discharge machining head assembly is configured to drill a hole of up to about 12 mm in diameter.

10. An apparatus for machining comprising:
 a discharge machining head assembly;
 a tilt device supporting the head assembly for tilting the head assembly with respect to a work piece; and
 a head assembly adaptor plate coupled to the discharge machining head assembly for supporting the head assembly on the tilt device.

11. The apparatus of claim 10, wherein the adaptor plate is configured to also couple to a multi-axis robot arm.

12. The apparatus of claim 10, wherein the apparatus has dimensions no larger than about 6.5 inches by about 9.6 inches by about 5.5 inches.

13. The apparatus of claim 10, wherein the apparatus has dimensions no larger than about 3.3 inches by about 4.8 inches by about 2.8 inches.

14. The apparatus of claim 10, wherein the discharge machining head assembly is an electro-discharge machining head assembly.

15. The apparatus of claim 10, wherein the discharge machining head assembly is an electrochemical discharge machining head assembly.

16. The apparatus of claim 10 wherein the discharge machining head assembly is configured to drill a hole of about 12 mm in diameter.

17. An apparatus for machining comprising:
a discharge machining head assembly;
an electromagnet for supporting the head assembly on a work piece surface;
a sliding assembly coupled to the discharge machining head assembly; and
a sliding assembly adaptor plate coupled to the head assembly for supporting the sliding assembly on the electromagnet.

18. The apparatus of claim 17, wherein the adaptor plate is configured to couple to a multi-axis robot arm.

19. The apparatus of claim 17, wherein the head assembly has dimensions no larger than about 6.5 inches by about 9.6 inches by about 5.5 inches.

20. The apparatus of claim 15, wherein the head assembly has dimensions no larger than about 3.3 inches by about 4.8 inches by 2.8 about inches.

21. The apparatus of claim 17 configured to have 5 axes of adjustment.

22. The apparatus of claim 17, wherein the sliding assembly comprises three manual slides which are configured to provide 3 axes of adjustment to the discharge machining head assembly.

23. The apparatus of claim 17, wherein the slide assembly comprises a tilt and swivel vice which is configured to provide 2 axes of adjustment to the discharge machining head assembly.

24. The apparatus of claim 17, wherein the discharge machining head assembly is an electro-discharge machining head assembly.

25. The apparatus of claim 17, wherein the discharge machining head assembly is an electrochemical discharge machining head assembly.

26. The apparatus of claim 17 wherein the discharge machining head assembly is configured to drill a hole of about 12 mm in diameter.

27. A method for machining comprising:
magnetically attaching a machining tool to a surface;
positioning a drill electrode to a work piece via a slide assembly; and
drilling the work piece with the machining tool;
wherein the slide assembly permits linear displacement of the machining tool generally parallel to the supporting work piece surface.

28. The method of claim 27, wherein the drilling act comprises:
drilling the work piece with the machining tool using electro-discharge machining.

29. The method of claim 27, wherein the drilling act comprises:
drilling the work piece with the machining tool using electrochemical discharge machining.

30. The method of claim 27, wherein the drilling act comprises drilling out a stator blade pin with the machining tool.

31. The method of claim 27 wherein the positioning act comprises:
adjusting a 5 axis slide assembly to position the drill electrode.

* * * * *